US012508615B2

(12) United States Patent
Rees et al.

(10) Patent No.: US 12,508,615 B2
(45) Date of Patent: Dec. 30, 2025

(54) FRONT-MOUNT CAMERAS ON AGRICULTURAL SPRAYER WITH REAL-TIME, ON-MACHINE TARGET SENSOR

(71) Applicant: Deere & Company, Moline, IL (US)

(72) Inventors: Steven Rees, Top Camp (AU); Tarik Loukili, Urbandale, IA (US); Michael P. Schlax, Yarmouth, ME (US)

(73) Assignee: DEERE & COMPANY, Moline, IL (US)

( * ) Notice: Subject to any disclaimer, the term of this patent is extended or adjusted under 35 U.S.C. 154(b) by 443 days.

(21) Appl. No.: 18/160,363

(22) Filed: Jan. 27, 2023

(65) Prior Publication Data

US 2024/0253074 A1 Aug. 1, 2024

(51) Int. Cl.
*A01M 7/00* (2006.01)
*B05B 1/20* (2006.01)
*B05B 12/12* (2006.01)
*G05B 13/02* (2006.01)

(52) U.S. Cl.
CPC ......... *B05B 12/122* (2013.01); *A01M 7/0089* (2013.01); *B05B 1/20* (2013.01); *G05B 13/0265* (2013.01)

(58) Field of Classification Search
CPC ....... A01M 7/0089; B05B 1/20; B05B 12/122
See application file for complete search history.

(56) References Cited

U.S. PATENT DOCUMENTS

| 10,701,926 B2 | 7/2020 | Struve |
| 12,070,762 B2 | 8/2024 | Van De Woestyne |
| 2012/0195496 A1* | 8/2012 | Zaman .................. G06T 7/0004 348/148 |
| 2019/0362160 A1* | 11/2019 | Torikura .................... G06T 1/00 |
| 2020/0230633 A1* | 7/2020 | Serrat ................. A01M 21/043 |
| 2022/0044030 A1 | 2/2022 | Neumann et al. |
| 2022/0124980 A1* | 4/2022 | Lorentzen ................ G06N 3/08 |

OTHER PUBLICATIONS

"N-Sensor transformed our business" https://www.yara.co.uk/crop-nutrition/agronomy-advice/transformed-our business/, retrieved on Jan. 23, 2023, 14 pages.
"Real-Time Variable Rate Nitrogen Management", https://www.yara.co.uk/crop-nutrition/tools-and-services/n-sensor/, retrieved on Jan. 23, 2023, 7 pages.

* cited by examiner

*Primary Examiner* — Tuongminh N Pham
(74) *Attorney, Agent, or Firm* — Christopher J. Volkmann; KELLY, HOLT & CHRISTENSON PLLC

(57) ABSTRACT

A camera is mounted on the front of a sprayer. Targets are identified from images generated by the camera. The location of the target is identified relative to a nozzle on the sprayer. A control signal is generated to control the timing and duration of actuation of the nozzle.

20 Claims, 7 Drawing Sheets

FRONT-MOUNT CAMERAS ON AGRICULTURAL SPRAYER WITH REAL-TIME, ON-MACHINE TARGET SENSOR

FIELD OF THE DESCRIPTION

The present description relates to the application of material to an agricultural field. More specifically, the present description relates to improving the accuracy of an agricultural machine that applies material to a field, using run-time, on-machine, target sensing.

BACKGROUND

Agricultural sprayers and other agricultural applicators apply chemicals and nutrients to agricultural fields. The chemicals and nutrients may be dry or liquid materials, and the materials can be applied for a number of reasons. For instance, the materials that are applied to a field may be pesticides, herbicides, fungicides, growth regulators, fertilizers, among others.

Some current agricultural sprayers and applicators apply product uniformly across the field, regardless of specific, localized needs. This is sometimes referred to as "broadcast" application. Some current systems also generate a prescription, prior to beginning the application process, that indicates where to apply material, which material to apply, and an application rate. The prescription is then loaded onto the agricultural sprayer and the selected product is applied to the locations in the field, based upon the prescription.

The prescription is often generated based on data that is aggregated using manual scouting, or imagery taken by machines, such as drones, aircraft, or satellites. The prescriptions may also be generated based on past field history.

The discussion above is merely provided for general background information and is not intended to be used as an aid in determining the scope of the claimed subject matter.

SUMMARY

A camera is mounted on the front of a sprayer. Targets are identified from images generated by the camera. The location of the target is identified relative to a nozzle on the sprayer. A control signal is generated to control the timing and duration of actuation of the nozzle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
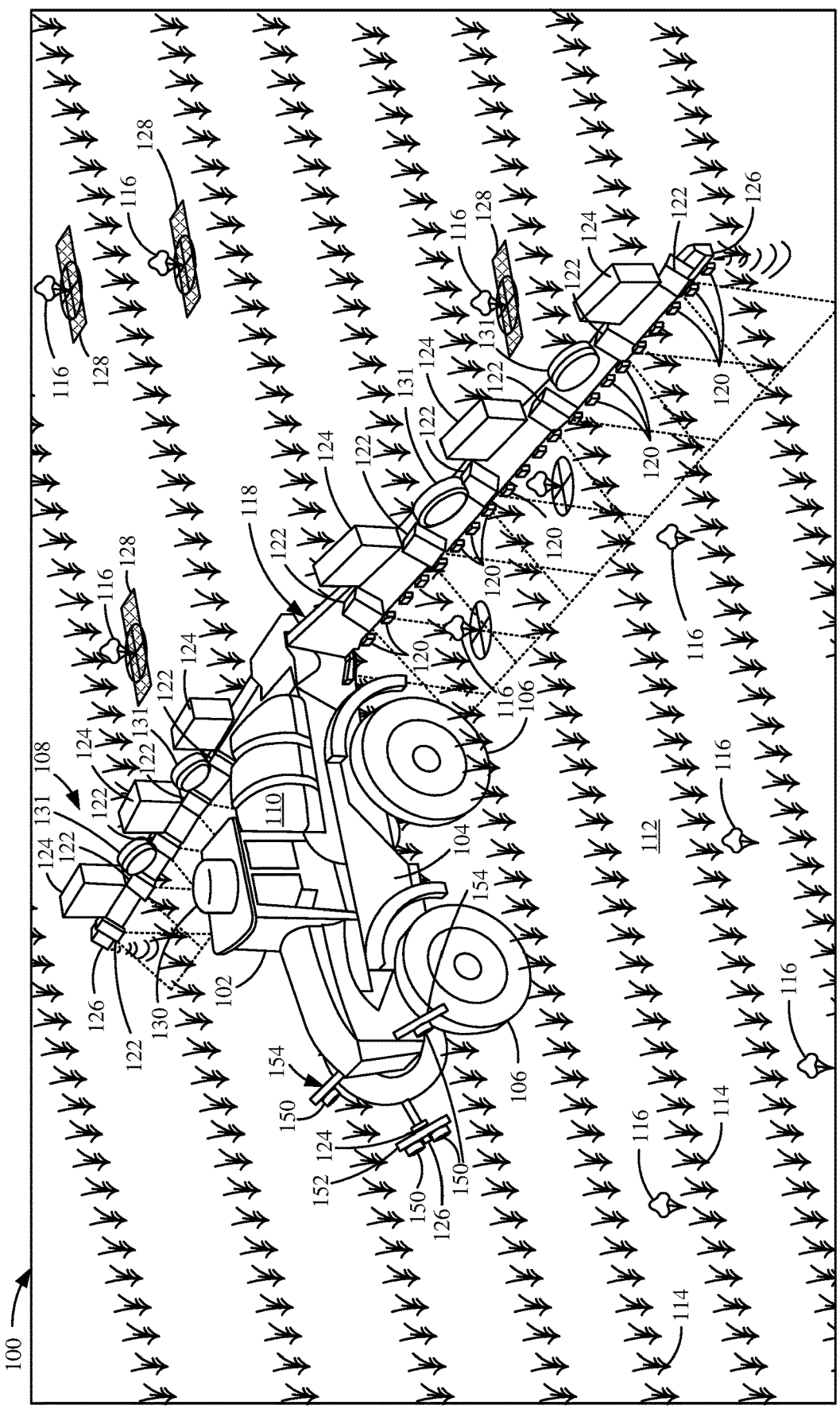
FIG. 1 is a pictorial view of an agricultural machine.

As described above, some current agricultural sprayers and agricultural applicators apply product uniformly across a field, regardless of any specific localized needs. This approach, sometimes referred to as a "broadcast" approach, results in the application of chemical and other materials where it is not required. This increases production costs and may have a potentially negative environmental impact. In some cases where herbicide is applied, for instance, up to 80% of the total product is applied where it is not needed.

Also, as briefly discussed above, some current systems attempt to generate a prescription indicating where to apply material to the field. However, the prescription is created ahead of time (prior to the application process by which the agricultural machine applies the material to the field). The prescription is then loaded into the agricultural sprayer, or agricultural applicator, and used in applying the material to the field.

Although this process may reduce the amount of material being applied, it has significant limitations. For instance, because the data used to generate such prescriptions is obtained through manual scouting or through imagery, or through past field history, the data is subject to georeferencing and application errors. Therefore, the locations of the particular targets of the material application are not precisely defined. This, in turn, means that larger application zones around the targets are used in order to ensure that the desired targets are indeed covered by the material being applied.

A problem with data collection from aerial images is that the image quality is often not adequate to identify targets, such as pests or weeds. The image quality issues are normally attributed to the height at which the images were taken or the distance from the targets at which the images were taken, lighting conditions, cloud cover, obscurants, and other atmospheric conditions. Similarly, because these types of images and other data collection processes are performed hours or even days or weeks ahead of the application process, the targets in the field may have changed or additional targets may have appeared, so that the sprayer will not be operating on an accurate prescription.

The present description thus proceeds with respect to a system that provides a real-time, on-board target identification and control system that uses optical sensors, mounted on a sprayer or other agricultural applicator (hereinafter referred to as the agricultural machine). The target identification and control system captures an image of an area ahead of the agricultural machine, in the direction of travel, and processes that image to identify targets in time for applicator functionality on the agricultural machine to apply a material to those targets.

In some current systems, the optical sensors are cameras that are mounted on a sprayer boom, which also carries nozzles. The sprayer boom is often mounted on the rear of a self-propelled sprayer vehicle or another sprayer. Images captured by the cameras are processed by image processing functionality to identify targets (such as weeds) in the images. The cameras are oriented on the boom so that the region of interest that is captured in the images generated by the cameras is forward of the boom in the direction of travel.

The location of targets identified in the regions of interest are correlated to nozzles on the boom so that material can be applied to the targets.

In such systems, the boom often extends in a transverse direction relative to the direction of travel of the sprayer, and extends transversely out past the rear wheels of the sprayer. For instance, some sprayer booms may be in excess of 100 feet long, with multiple cameras disposed along the boom and some cameras being disposed directly behind the sprayer, in the direction of travel.

The placement of the cameras in this way can present problems. For example, directly behind the vehicle, there may be a relatively large amount of dust or other obscurants that are generated as the sprayer travels through the field. This can make it difficult for image processing functionality to identify targets in the images captured by the cameras directly behind the sprayer. Similarly, the cameras directly behind the sprayer often capture images of portions of the sprayer (such as the tires, the sprayer frame, etc.) and light that is directed onto the field may also reflect off those portions of the sprayer, making it even more difficult to identify targets in the captured images. Also, the sprayer may cast shadows that inhibit target identification, Further, it is not uncommon for the sprayer to run over crops or weeds or other targets, thus making them more difficult to identify as well.

The present description thus proceeds with respect to a sprayer that has cameras mounted on the front of the sprayer to improve the accuracy of target identification in the images captured by those cameras. Since the images are captured ahead of the sprayer, there is less dust, fewer obscurants/shadows and reflections, etc., making target identification more accurate.

When the sprayer is traveling in a relatively straight line, the location of a target in the captured images is correlated to a nozzle on the boom and that nozzle is actuated to apply material to the target. When the sprayer is turning at an angle, the angle of the turn may be considered in correlating the location of the target in the captured image to a nozzle so that the correct corresponding nozzle is actuated to apply material to the target.

Also, in one example, cameras are also mounted to the boom at the rear of the sprayer so that a first image of the field is captured before the sprayer travels over the field (by the cameras mounted on the front of the sprayer), and a second image of the field is captured after the sprayer has traveled over the field (by the cameras mounted to the rear of the sprayer). Those two images can be processed to derive a wide variety of different information. For instance, the two images can be processed to better characterize dust or obscurants that occur behind the sprayer. The two images can also be processed to better characterize shadows or reflections that are generated at the rear of the sprayer. Those characterizations can be used by a machine learning system to improve image processing models or algorithms.

FIG. 1 shows a pictorial illustration of one example of an agricultural machine 100. Agricultural machine 100 is depicted as an agricultural sprayer that has an operator compartment 102, supported by a frame structure 104, which also supports ground engaging elements 106. In the example shown in FIG. 1, ground engaging elements 106 are wheels, but they could be tracks or other implementations. FIG. 1 also shows that agricultural machine 100 has a spray system generally indicated by 108. Spray system 108 illustratively includes a tank or other material reservoir 110 that carries material that is to be applied to an agricultural field 112. In the example shown in FIG. 1, agricultural field 112 has row crops planted in rows 114 and a plurality of weeds 116 that are growing therein. While FIG. 1 shows one material reservoir 110, it will be noted that agricultural machine 100 may have more than one material reservoir 110 each carrying a different material or different concentration of material. Also, while FIG. 1 shows machine 100 in a field with rows 114 of crops, the present description can also proceed with an example in which machine 100 is treating an area without crops, such as a field after harvest and before planting, or another area without crops.

Spray system 108 also illustratively includes a boom structure 118 that supports a plurality of controllable nozzle bodies 120. Nozzle bodies 120 can include an electronic controller that receives commands over a network, such as a controller area network—CAN, or other data communication protocols. The nozzle body 120 can also include one or more controllable valves that can be moved between an open position and a closed position. The nozzle body 120 can also include one or more nozzle spray control tips. Material to be applied by agricultural machine 100 is pumped by one or more pumps from tank 110, through hoses or other conduits, to the nozzle bodies 120. The controller in the nozzle bodies 120 controls the controllable valves to open (or move to the on position) so that the material moves through the nozzle body and out through the nozzle spray control tip where the material is applied to the field 112. When the valve is controlled to be in the closed position (or the off position) the material does not pass through the valve. In one example, the valves are variable between the on and off positions, such as proportional values. In other examples, a variable flow rate can be achieved through the valves by controlling the pump or by controlling the valves in a pulse width modulated manner (varying the cycle time) or in other intermittent ways.

FIG. 1 also shows that agricultural machine 100 is fitted with a plurality of different optical image sensors 122 (shown as cameras in FIG. 1) mounted on boom 118 and a plurality of optical image sensors (e.g., cameras) 150 mounted to support bars 152 and 154 on the front of agricultural machine 100. Image sensors 122, 150 may be optical sensors which capture images by sensing radiation in the optical spectrum which, for purposes of the present discussion, includes ultraviolet, visible, and infrared frequencies. The image sensors 122, 150 are disposed along the boom 118 and support bars 152, 154 so that they have fields of view that cover the length of the ground in front of the boom 118. For instance, the image sensors 122, 150 are disposed across boom 118 and support bars 152, 154 so that their fields of view cover all of the area of field 112 forward of nozzle bodies 120, as agricultural machine 100 travels through the field.

The image sensors 122, 150 are illustratively coupled to one or more image processing modules 124. The image processing modules 124 illustratively process the images captured by image sensors 122, 150 to identify targets (e.g., weeds 116 or rows 114) on field 112 over which agricultural machine 100 is traveling. Image sensors 122, 150 can have an image processing system that performs some preprocessing. For instance, different cameras may be different so the on-camera image processing system may generate color correction matrices that adjust or calibrate the camera so all cameras produce images of the same color. The on-board image processing system can also perform other processing, such as lens shading correction, local tone mapping, demosaic, color correction, and distortion correction. The correction information can be captured in correction matrices or in other ways. Some or all of the pre-processing can be performed on the image processing modules 124 as well.

It will be noted that, in one example, the position of boom 118 and support bars 152, 154 (and in particular the position of each image sensor 122, 150) relative to the surface of field 112, may change the field of view of the image sensors 122. For example, at a first height above the field, an image sensor 122, 150 may have a field of view with a first size so the area or region of interest being analyzed for targets takes up most of the field of view. However, when the image sensor 122, 150 is moved to a greater height (further from the ground), then the area of the region on the ground that is included in the field of view of image sensor 122, 150 may be larger, but the area being examined for targets remains the same.

Therefore, in one example, boom 118 and support bars 152, 154 have one or more sensors 126 that sense the height (in another implementation, sensor 126 can also or alternatively sense the angle and/or vibrations) of boom 118 and support bars 152, 154 relative to the surface of field 112 over which they are traveling. The height (and angle) can be used by image processing modules 124 to correct the images received from the various image sensors 122, 150, based upon their location relative to the ground from which the images are captured. Thus, in one example, the image processing modules 124 identify weeds 116 as targets of a herbicide being applied by agricultural machine 100 and identify information about the location of the weeds 116 to correlate each weed to a nozzle. The identified nozzle and timing information can be sent to a nozzle controller so that the nozzle controller can control the valves in the nozzle bodies 120 to apply the herbicide to the weeds 116. In one example, the nozzle bodies are controlled to apply the material in a treated area 128 that has a buffer area on either side of weed 116 to increase the likelihood that the weed 116 is treated by the herbicide.

Image processing may be affected by ambient light conditions. Therefore, FIG. 1 also shows that boom 118 and support bars 152, 154 may have one or more supplemental light sources 131 which can be activated in low light conditions.

Also, in order to process the images in various different types of light conditions (which may change based on whether agricultural machine 100 is heading into the sun, away from the sun, or otherwise), FIG. 1 shows that agricultural machine 100 can have a white balance camera or an incidental light sensor (light sensor 130). Light sensor 130 can sense the direction of the sun relative to agricultural machine 100, the color of the sun (such as whether the sky is overcast, whether machine 100 is traveling through a shadow, or other conditions that change the color of the light), and the light intensity among other things. Similarly, light sensors 130 may be disposed at one or more locations along boom 118 and support bars 152, 154 instead of, or in addition to, light sensor 130 on the body of the agricultural machine 100, as shown in FIG. 1. The ambient lighting conditions are sensed by light sensor(s) 130 and the information representing the ambient lighting conditions is sent to image processing modules 124. The data can be sent using data over power transmission, using a gigabit multimedia serial link (GMSL or GMSL2) or using another communication mechanism.

Figure 2:
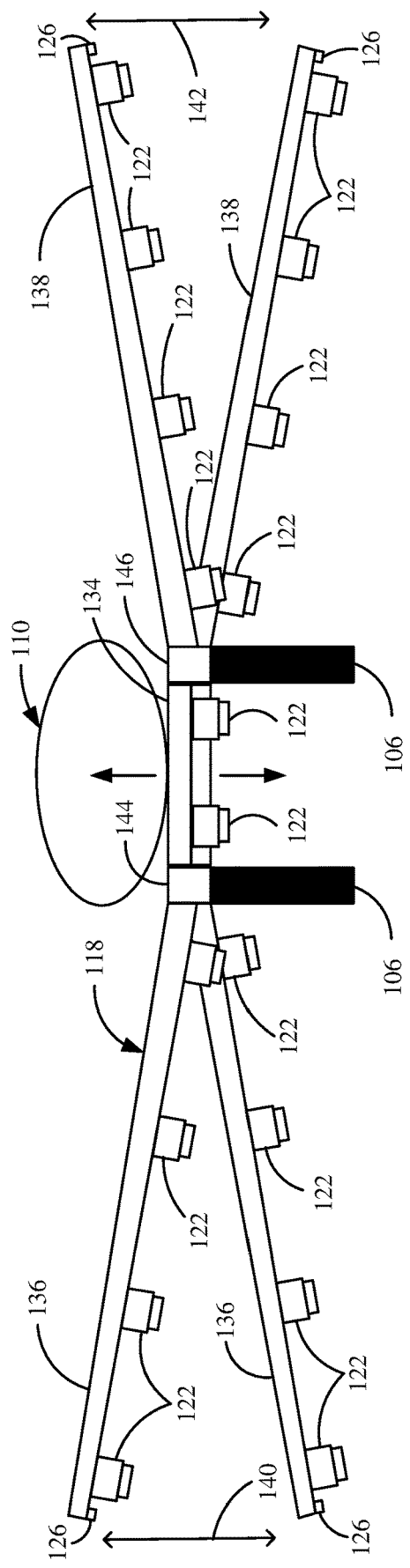
FIG. 2 is a pictorial view illustrating movement of a boom on an agricultural machine.

FIG. 2 shows a pictorial illustration of a rear view of a portion of agricultural machine 100, and items that are similar to those shown in FIG. 1 are similarly numbered. FIG. 2 shows that boom 118 can have a central boom section 134 and one or more boom arms 136 and 138 on either side of central boom section 134. In one example, central boom section 134 can be raised and lowered under force of a central boom actuator (not shown in FIG. 2). As shown in FIG. 2, boom arms 136 and 138 may rotate about pivot points 144 and 146, respectively. Thus, the image sensors 122 may not simply be traveling in a vertical direction when boom arms 136 and 138 are raised and lowered, but they are moving in an arc about pivot points 144 and 146. This can cause the orientation of the cameras to be focused more inwardly, toward a central longitudinal axis of agricultural machine 100, or outwardly, away from agricultural machine 100. Thus, as the boom 118 moves, the perspectives of the cameras, and thus the fields of view of the image sensors 122 on the ground, will move as well. Similarly, as agricultural machine 100 travels through the field, it may encounter bumps, ruts, or other disturbances on the ground. This may cause the boom arms 136 and 138 to move upwardly or downwardly in the directions indicated by arrows 140 and 142. Therefore, in one example, the cameras or image sensors 122 are calibrated at different heights from the ground (e.g., at different boom positions). A calibration transform is generated that can be used to transform the captured images so that the area of interest (or region of interest—ROI) within the image captured by each image sensor 122 remains at a fixed location on the ground relative to the corresponding image sensor 122 (e.g., one meter in front of the image sensor in the direction of travel), regardless of the boom position. The same can be done for cameras 150 at different positions of support bars 152, 154 (which may occur, for instance, as the agricultural machine travels over ruts or other uneven terrain on field 112).

Figure 3:
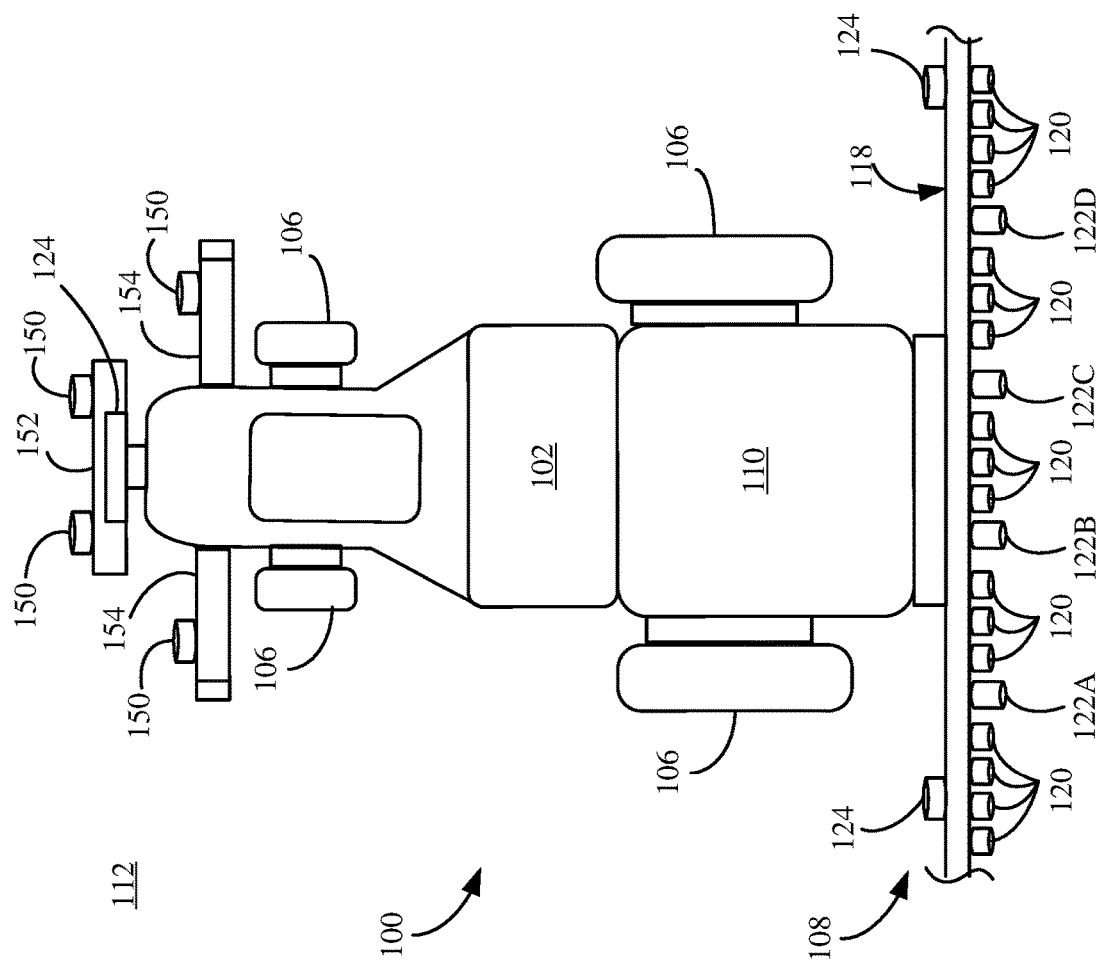
FIG. 3 is a top view of the agricultural machine.

FIG. 3 is a pictorial top view of a portion of agricultural machine 100. FIG. 3 shows that, in one example, machine 100 not only has cameras 150 mounted on support bars 152, 154 at the front end of machine 100 (e.g., the front end cameras), but also has redundant cameras (e.g., cameras 122A, 122B, 122C, and 122D) mounted on boom 118 behind machine 100. In one example, images processed by cameras 150 can be used to identify targets. The location of those targets can be correlated to nozzles 120 on boom 118 so that material can be applied from the correlated nozzle to the target. It will be noted that, in one example, when agricultural machine 100 is traveling in a straight line, then the nozzles located behind the cameras 150 will be the nozzles that are used to apply material to the targets identified in the images captured by cameras 150. However, if agricultural machine 100 is turning at an angle, then it may be that the nozzles 120 behind the cameras 150 will not pass over the targets. Instead, due to the angle of the turn, the nozzle that passes over the target may be a nozzle that is not located behind the camera 150 that captured the target-containing image. Instead, the nozzle that passes over the target may be offset in either direction along boom 118 from the nozzle 120 that is located behind the camera 150. In that case, the image processing system estimates the nozzle that should be actuated to apply material to the target, based upon the sensed turning angle (or route) being followed by agricultural machine 100.

Also, in the example shown in FIG. 3 in which redundant cameras 122A-122D are provided behind agricultural machine 100 in addition to cameras 150 that are provided at the front end of agricultural machine 100, the images taken by the redundant cameras 122A-122D can be processed along with the images captured by the front end cameras 150 to obtain information. For instance, because cameras 150 will be capturing images of the field 112 before agricultural machine 100 has traveled over that portion of the field 112, and because cameras 122A-122D will be capturing images of the field 112 after agricultural machine 100 has passed over the field 112, the two images can be compared to better characterize or classify dust or other obscurants that is generated, under various conditions, by agricultural machine 100. Information indicative of this characterization can be output to a model generator or machine learning system in order to improve the accuracy of identifying targets where cameras are only mounted behind agricultural machine 100.

Similarly, cameras 122A-122D will capture images that may include shadows or portions of agricultural machine 100 or light reflections off of agricultural machine 100. Therefore, the images captured by cameras 150 and cameras 122A-122D can be compared to better characterize the shadows or reflections or portions of agricultural machine 100 captured in the images generated by cameras 122A-122D. Again, this information can be used in order to improve the accuracy of identifying targets in images captured where only cameras 122A-122D are used and where there are no front end cameras 150.

Further, it may be that agricultural machine 100 runs over the crops or weeds or other targets in field 112. In that case, the images captured by front end cameras 150 can be compared with those captured by redundant cameras 122A-122D in order to better characterize the appearance of the crops or weeds or other targets after agricultural machine 100 has passed over a portion of the field 112. The information generated by processing the images captured by the front end cameras 150 and the redundant cameras 122A-122D can be used by machine learning systems or other systems in order to improve the accuracy of target identification in the spraying system.

Figure 4:
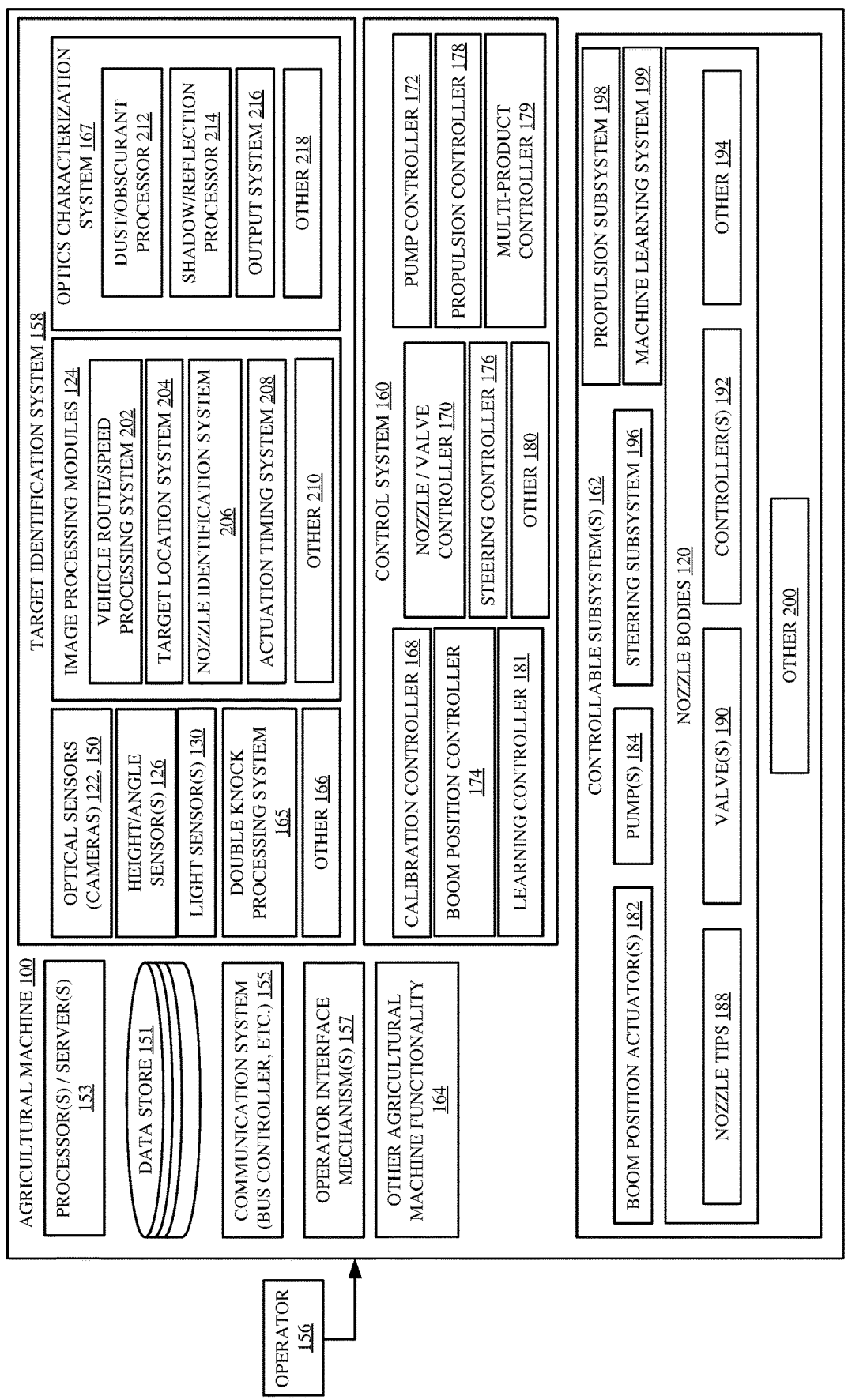
FIG. 4 is a block diagram showing one example of an agricultural system.

FIG. 4 is a block diagram showing some portions of agricultural machine 100 in more detail. Some of the items shown in FIG. 4 are similar to those shown in FIGS. 1-3 and they are similarly numbered. FIG. 4 shows that agricultural machine 100 can also include one or more processors or servers 153, data store 151, a communication system 155, one or more operator interface mechanisms 157 that an operator 156 can interact with in order to control and manipulate agricultural machine 100, target identification system 158, control system 160, controllable subsystems 162, and agricultural machine 100 can include a wide variety of other agricultural machine functionality 164. Target identification system 158 can include optical sensors 122, 150, image processing modules 124, light sensors 130, height/angle sensors 126, double knock processing system 165, optics characterization system 167, and other items 166. Image processing modules 124 can include vehicle route/speed processing system 202, target location system 204, nozzle identification system 206, actuation timing system 208, and other items 210. Optics characterization system 167 can include dust/obscurant processor 212, shadow/reflection processor 214, output system 216, and other items 218. Other items 166 can include such things as a machine speed sensor, a heading or route sensor, machine orientation sensor, among other things. Control system 160 can include calibration controller 168, nozzle/valve controller 170, pump controller 172, boom position controller 174, steering controller 176, propulsion controller 178, multi-product controller 179, and learning controller 181. Control system 160 can also include other items 180. Controllable subsystems 162 can include boom position actuators 182, one or more pumps 184, nozzle bodies 120 (which, themselves, can include one or more nozzle tips 188, valves 190, valve controllers 192, and other items 194), steering subsystem 196, propulsion subsystem 198, machine learning system 199, and a wide variety of other items 200.

Before describing the overall operation of agricultural machine 100 in identifying targets, correlating the targets to nozzles, and applying material, a description of some of the items shown in FIG. 4, and their operation, will first be provided. Operator interface mechanisms 157 can include any of a wide variety of mechanisms that can be used to provide information to operator 156 and receive interactive inputs from operator 156. Operator interface mechanisms 157 can include audio, visual, and haptic mechanisms, among others. Examples of operator interface mechanisms 157 can include a steering wheel, joysticks, pedals, levers, buttons, microphones and speakers (such as when speech recognition/synthesis functionality is provided), among other things. Operator interface mechanisms 157 can include display screens, touch sensitive display screens, lights, audible alert mechanisms, etc. When the operator interface mechanisms 154 include a display screen, operator input mechanisms can be provided on the display screen. Such operator input mechanisms can include buttons, links, icons, or other user actuatable elements that can be actuated using a point and click device, a touch gesture, a voice input, or other interactions.

Communication system 155 can include a bus controller that controls information on one or more bus structures (such as a CAN bus, a plurality of different CAN subnetworks, or another bus) on agricultural machine 100. Communication system 155 can include wired networking components such as ethernet components that operate according to a known standard (e.g., IEEE 802.3), and other types of network and communication system components. Communication system 155 can also include other communication systems that allow agricultural machine 100 to communicate with remote devices or systems. Such communication systems can include a cellular communication system, a local area network communication system, a wide area network communication system, a near field communication system, or a wide variety of other communication systems or combinations of systems.

Target identification system 158 illustratively identifies targets where material is to be applied by agricultural machine 100 and also identifies nozzle(s) that are to be actuated and the timing of actuation to apply material to the targets. For example, when agricultural machine 100 is to apply the material to crop plants, then target identification system 158 identifies crop plants (such as crop rows or other crop plants such as seeded crops). When agricultural machine 100 is to apply the material to a weed, for instance, then target identification system 158 identifies weeds so that the material can be applied to them. Therefore, each of the image sensors 122, 150 captures images of a region of interest within the field of view corresponding to the image sensor 122, 150. The captured image can be compensated or corrected based on information detected by light sensor 130. Image processing modules 124 then process the images captured by image sensors 122, 150 to correct them and target location system 204 identifies targets (e.g., crop rows, weeds, etc.) in the images. Vehicle route/speed processing system 202 can receive inputs indicative of the route or heading and pose or orientation of machine 100 and provide an output indicative of that information to nozzle identification system 206. The images can then be transformed based on information captured by boom sensors 126 and mapping coefficients that match pixels in the image (e.g., the pixels corresponding to a target) to actual locations on the ground. Nozzle identification system 206 can identify which nozzles are to be actuated, and when they are to be actuated (e.g., time and duration), to apply the material to the targets. That information can then be provided to control system 160 to control the nozzle bodies 120.

It may also happen that agricultural machine 100 makes multiple passes through a field, when the passes are separated by some duration of time. For instance, some weeds may need multiple applications of one or more herbicides, with one to two weeks between applications, in order to kill them. After the first application, the weeds may appear to be dead, but unless they are treated again, they may again begin actively growing. Similarly, the weeds may be resistant to the chemical that is applied during the first pass, so that the weed still appears vibrant during the second pass. Therefore, it may be desirable to have agricultural machine 100 apply an additional dose of herbicide to the weeds, or to apply a dose of different herbicide, even though they were previously treated.

In such cases, target identification system 158 stores the location of the targets during the first pass through the field. Then, during the second pass through the field, even though the weeds may appear to be dead so that they are not identified as weed targets by target identification system 158, double knock processing system 165 identifies that particular geographic location (where the weed was treated during the first pass) as a target for a second application of the herbicide. Similarly, double knock processing system 165 can identify that a vibrant weed still exists where it was treated during the first pass and multi-product controller 179 can generate an output to apply a different chemical or an increased dose of the original chemical to the weed on the second pass than was applied during the first pass. Double knock processing system 165 receives the stored map of weed locations that was generated during the first pass and a geographic position sensor senses a geographic position of agricultural machine 100. The geographic position sensor may thus be a global navigation satellite system (GNSS) receiver, a dead reckoning system, a cellular triangulation system, or another position sensor. Based upon the current position of agricultural machine 100, its speed, and the dimensions of the machine, double knock processing system 165 can identify which nozzles will be passing over weed locations where another application of herbicide is to be administered. Multi-product controller 179 can determine whether the same or a different material is to be administered.

Optics characterization system 167 also performs characterization on the detected optical features in the captured images, where redundant cameras 122A-122D are used. Dust/obscurant processor 212 can compare the images captured by the front end cameras 150 and the redundant cameras 122A-122D to identify characteristics of dust or other obscurants that are present after agricultural machine travels over the field. For instance, by comparing the image captured by one of the front end cameras 150 (which will be clear of dust and other such obscurants) with an image captured by the redundant cameras 122A-122D (which will include the dust and/or other obscurants that are introduced by agricultural machine 100 traveling over the field) processor 212 can identify the characteristics of the dust and the other obscurants to enhance the ability of the image processing system to identify targets in the presence of dust or obscurants.

Similarly, shadow/reflection processor 214 can compare the images captured by the front end cameras 150 and the redundant cameras 122A-122D to characterize reflections or shadows that are seen behind the agricultural vehicle 100 in order to assist the image processing system in identifying targets under such shadowy conditions, or where such reflections are present. Other characterizations can be performed as well.

Output system 216 can generate an output indicative of the results of the characterization of the dust, obscurants, shadows, reflections, and/or other items, to learning controller 181 which controls a machine learning system 199, or to an artificial intelligence system that trains the model or algorithm used in identifying targets based upon the characteristics. This can help to improve the performance of the target identification system 158 under various conditions.

Thus, target identification system 158 (whether targets are identified based on inputs from sensors 122, 150 or double knock processing system 165) generates an output indicating which nozzles are to be activated, when they are to be activated, and a duration of time for which they are to be activated, based upon the image analysis performed by image processing modules 124 and the processing performed by double knock target identification system 165.

Target identification system 158 also outputs an indication of the optical characterization results generated by optics characterization system 167. Those outputs can be provided to learning controller 181 which controls learning system 199 to better learn how to identify targets under various conditions.

Learning system 199 can be an artificial intelligence systems or other machine learning system that can output a model or modify a model or other algorithm used in target identification. Learning controller 181 controls learning system 199 based upon the outputs from optic characterization system 167 so that the learned model or algorithm can better identify targets under various, suboptimal conditions (such as dusty conditions, conditions where there are obscurants, shadows, reflections, etc.).

The outputs from target identification system 158 are provided to control system 160 which generates control signals to control controllable subsystems 162.

Calibration controller 168 can perform calibration operations to calibrate various items on agricultural machine 100. Multi-product controller 179 determines which product is to be applied. Nozzle/valve controller 170 generates control signals to control nozzle bodies 120. The control signals are received by controller 192 which controls the on and off state of valves 190 to apply the correct material at the correct location, according to the correct timing. Controller 192 can also control nozzle tips 188 (where they are configurable) to change the area of application of the nozzle.

Pump controller 172 may generate control signals to control pumps 184 that pump the material to be applied through the conduits on boom 118 to the nozzle bodies 120. Boom position controller 174 may generate control signals to control boom position actuators 182 to move the various portions of boom 118 to different desired positions. Steering controller 176 may generate control signals to control steering subsystems 196 to control the heading of agricultural machine 100. Propulsion controller 178 may generate control signals to control propulsion system 198 (which may be an engine that drives ground engaging mechanisms 106 through a transmission, individual motors that drive the individual ground engaging mechanisms 106, or another power source that drives the propulsion of agricultural machine 100) to control the speed and forward/reverse direction of travel of agricultural machine 100. Learning controller 181 can control machine learning system 199.

Figure 5:
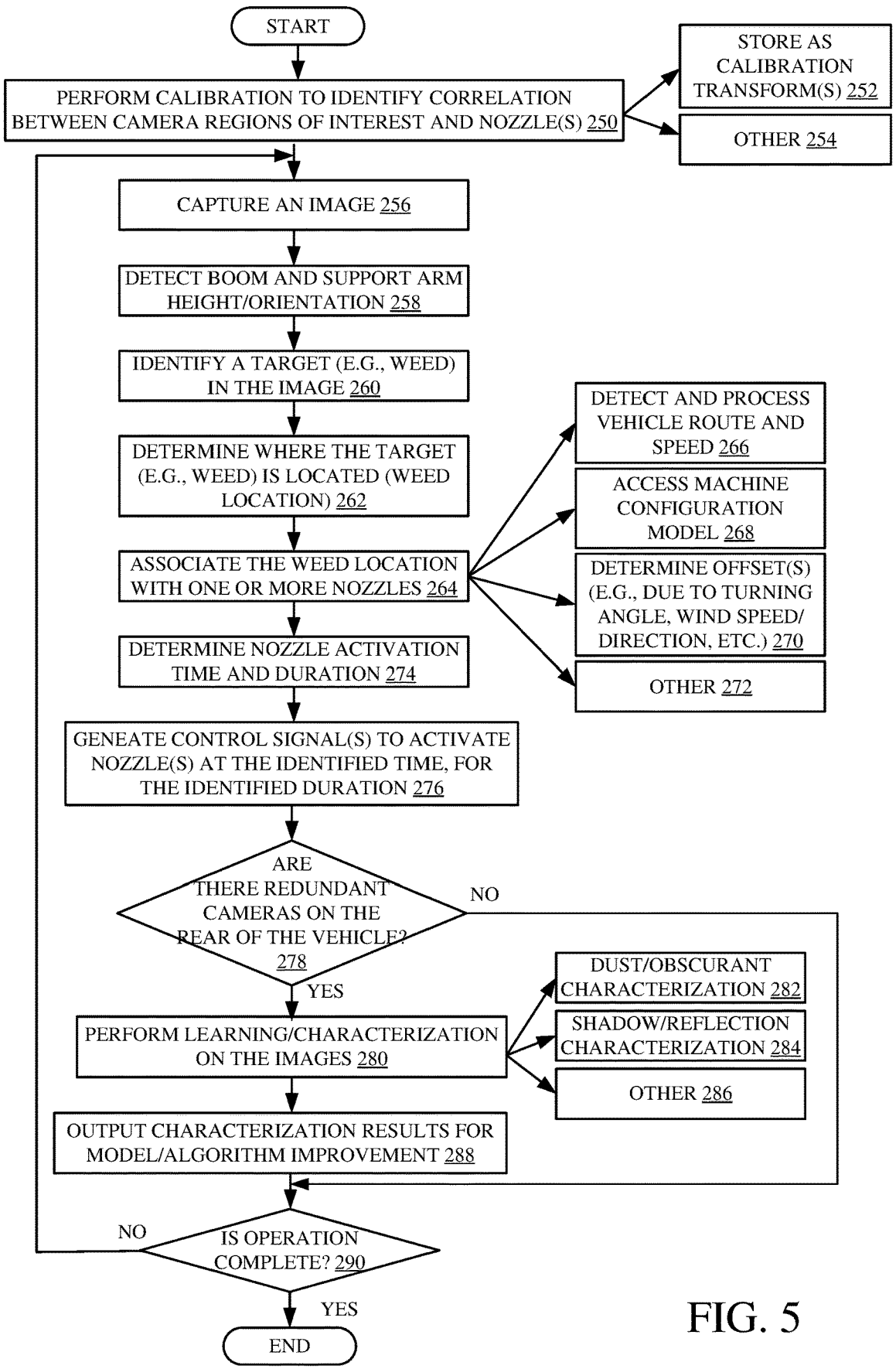
FIG. 5 is a flow diagram showing one example of the operation of the agricultural system.

FIG. 5 is a flow diagram illustrating one example of the operation of target identification system 158 in identifying targets and control system 160 in controlling nozzle bodies 120. It is first assumed that calibration controller 168 has performed calibration to identify a correlation between the different camera regions of interest corresponding to the different optical sensors 122, 150, and one or more nozzle bodies 120, as indicated by block 250 in the flow diagram of FIG. 5. For instance, calibration transforms can be generated that identify which nozzles are actuated to cover which regions of interested captured by the different cameras 122, 150 under different circumstances, such as under different boom or support arm positions, at different turning angles, or in other conditions. Storing these correlations as calibration transforms that can later be accessed to identify nozzles which are to be actuated is indicated by block 252. The calibration to identify a correlation between camera regions of interest and nozzles can be done in a wide variety other ways as well, as indicated by block 254.

Once the material application operation has begun, one or more of the image sensors 122, 150 capture images of the ground ahead of boom 118, as indicated by block 256 in the flow diagram of FIG. 5. It will be noted that the image sensors 122, 150 may be red green blue (RGB), near infrared green (NRG), or near infrared (NIR) cameras, or other images sensors. The sensors 122, 150 can be mono or stereo cameras. Sensors 122, 150 can be multi-spectral or hyperspectral sensors attached to boom structure 118 and/or support arms 152, 154. Sensors 126 then sense the boom height corresponding to the image, and/or the support arm height corresponding to the image. The boom height is detected when the image is captured by an image sensor 122, while the support arm height is detected when the image is captured by one of the image sensors 150. The boom and/or support arm orientation can also be detected, such as when the boom arms are swinging upwardly or downwardly, when the machine is going through a rut or over a mound of dirt, or other uneven terrain, etc. Detecting the boom and support arm height and/or orientation is indicated by block 258 in the flow diagram of FIG. 5. It will be appreciated that the height and/or orientation of each of the different boom sections and each of the different support arms can be individually detected, or they can be estimated based upon a single detection or a set of detections. The boom and/or support arm height can be measured from the ground, from the crop canopy, or in other ways. The sensors 126 may be ultrasonic sensors, RADAR sensors, LIDAR sensors, accelerometers, etc.

Image processing modules 124 then perform image processing on the captured images to identify weeds or other targets in the images, as indicated by block 260. Target location system 204 determines, spatially, where the target is located, geographically, in the field 112. Where the target is a weed, this is referred to as the weed location. It can be another target location as well. In one example, identifying the weed location is done by locating the pixel coordinates of the center of the pixel clusters that represent weeds in relation to the region of interest for an image sensor 122, 150. Mapping coefficients or the calibration transforms can then be applied using the detected height and/or orientation of the structure supporting the image sensor 122, 150 in order to identify the location of the weed relative to the region of interest of the image sensor 122, 150. Determining where the target (e.g., weed) is located, is indicated by block 262 in the flow diagram of FIG. 5.

Nozzle identification system 206 then associates the weed location (or other target location) with one or more of the nozzles on boom 118. Associating the target location with the nozzles is indicated by block 264 in the flow diagram of FIG. 5. In one example, nozzle identification system 206 can access a configuration model or a configuration file stored in data store 151 that associates nozzles with image sensor regions of interest under different conditions.

For instance, vehicle route/speed processing system 202 may generate an output indicative of whether agricultural vehicle 100 is turning, the angle of the turn, the speed at which the vehicle is traveling, etc. The configuration model or configuration file may associate different nozzles with different image sensor regions of interest under different conditions, such as the angle at which the machine 100 is turning, etc. Also, real-time sensors can sense a wide variety of things such as wind speed, wind direction, the machine orientation, etc., which may influence the direction of the material after it leaves the nozzle. Thus, nozzle identification system 206 can consider these sensed criteria to determine whether a lateral adjustment is needed based upon wind speed, machine turning angle, wind direction, etc. Detecting and processing the vehicle route and speed to identify the nozzle is indicated by block 266. Identifying the nozzle by accessing machine configuration models or machine configuration files is indicated by block 268. Determining whether an offset is needed due to the turning angle, wind speed and direction, etc., is indicated by block 270. Associating the target location with one or more nozzles can be done in a wide variety of other ways as well, as indicated by block 272 in the flow diagram of FIG. 5.

Actuation timing system 208 then determines the nozzle activation time and duration. For instance, if the target is identified in an image captured by one of the image sensors 150, then the corresponding nozzle may not be actuated for an offset time which will correspond to the time needed for the application area covered by the nozzle to reach the target. This offset time may thus depend on machine speed, the separation between the region of interest of the image sensor 150 and the nozzle on machine 100, the latency in the nozzle activation, the flow rate of the material being applied, etc. The duration for which the nozzle is actuated may depend on how the material is to be applied (the application pattern). For instance, it may be that material is to be applied six inches on either side of the target, to ensure that the target receives applied material. Thus, based upon the size of the identified target and the machine speed, the duration of the actuation of the corresponding nozzle or valve can be determined. Determining the nozzle activation time and duration is indicated by block 274 in the flow diagram of FIG. 5.

Image processing modules 124 then provide an output to nozzle/valve controller 170. The output is indicative of the nozzle activation time and duration for a particular set of nozzles. Nozzle/valve controller 170 generates control signals to control the nozzle bodies 120 based upon the nozzle activation time and duration for the identified nozzles. Generating the control signals to activate the nozzles at the identified time, for the identified duration, is indicated by block 276 in the flow diagram of FIG. 5.

Optics characterization system 167 determines whether there are redundant cameras (or image sensors) 122A-122D on the rear of the agricultural vehicle (or mounted to the boom behind the vehicle) as indicated by block 278 in the flow diagram of FIG. 5. If so, then optics characterization system 167 performs characterization and learning based on the images captured by the redundant image sensors 122A-122D, and the image sensors 150. Performing characterization and learning based on those images is indicated by block 280 in the flow diagram of FIG. 5. For example, dust/obscurant processor 212 can characterize dust or other obscurants, as indicated by block 282. Shadow/reflection processor 214 can characterize shadows or reflections, as indicated by block 284. Other processors can generate other characterizations as well, as indicated by block 286. Output system 216 generates an output indicative of the characterization results to learning controller 181 which controls machine learning system 199 to learn or improve the models or algorithms used in identifying targets under the characterized conditions, as indicated by block 288.

Until the operation is complete, as indicated by block 290, processing reverts to block 256 where more images are captured.

It can thus be seen that the present system includes image sensors on the front of the sprayer so that images can be captured under conditions which are more favorable to target identification. In addition, redundant image sensors can be mounted behind the vehicle so that characterization of dust, obscurants, shadows, reflections, etc., can be performed in order to improve target identification under different conditions or when the redundant image sensors are used. Also, a wide variety of other information can be obtained based on the images from the front end image sensors 150 and the images captured by the redundant image sensors 122A-122D. It will also be noted that the number of image sensors and redundant image sensors are shown herein as an example only. There may be more images sensors and redundant image sensors, fewer image sensors and redundant image sensors, or different arrangements of images sensors and redundant image sensors, and those shown and discussed herein are shown and discussed for the sake of example.

Figure 6:
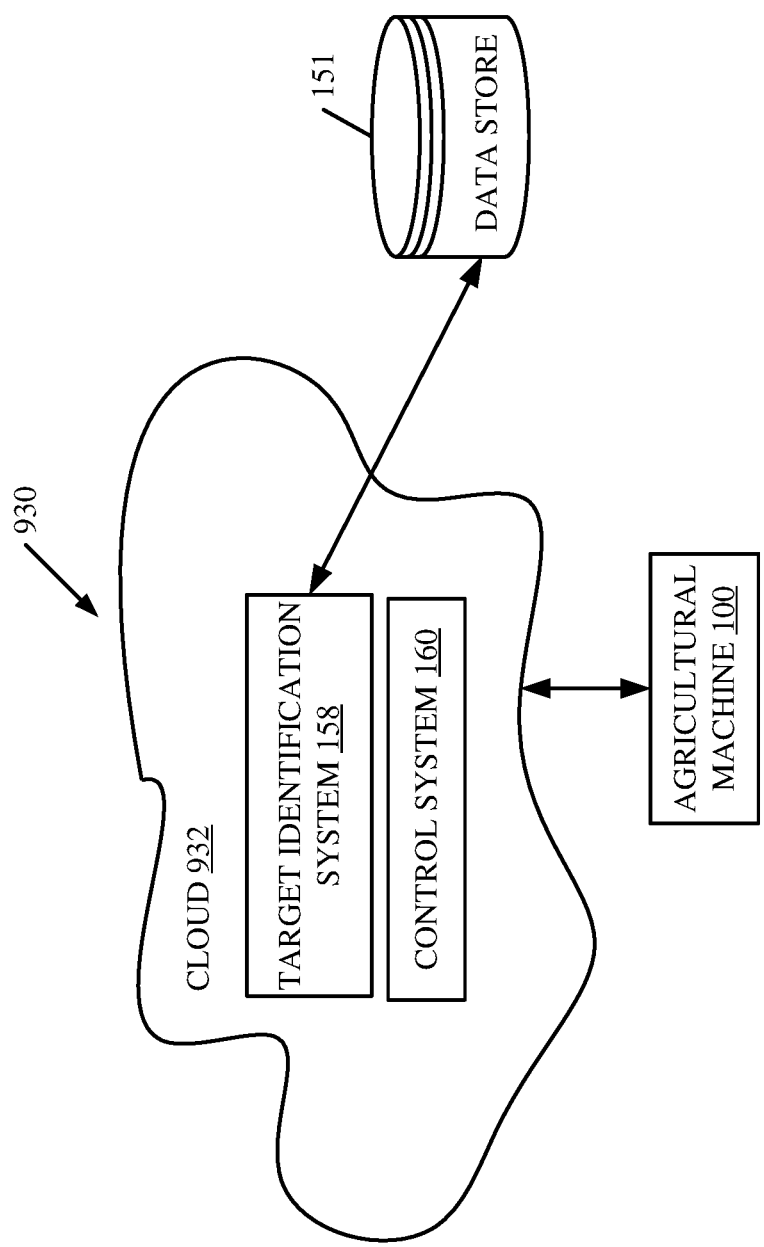
FIG. 6 is a block diagram showing one example of the agricultural machine illustrated in FIG. 1, deployed in a remote server environment.

FIG. 6 is a block diagram of machine 100, shown in FIG. 1, except that it communicates with elements in a remote server architecture 930. In one example, remote server architecture 930 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 6, some items are similar to those shown in previous FIGS. and they are similarly numbered. FIG. 6 specifically shows that target identification system 158, control system 160, and data store 151 (or portions of those items) can be located at a remote server location 932. Therefore, machine 100 accesses those systems or items through remote server location 932.

It is also contemplated that some elements of previous FIGS. can be disposed at remote server location 932 while others are not. By way of example, data store 151 can be disposed at a location separate from location 932, and accessed through the remote server at location 932. Regardless of where they are located, they can be accessed directly by machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 100 comes close to the fuel truck for fueling, the system automatically collects the information from the machine 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 100 until the machine 100 enters a covered location. The machine 100, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
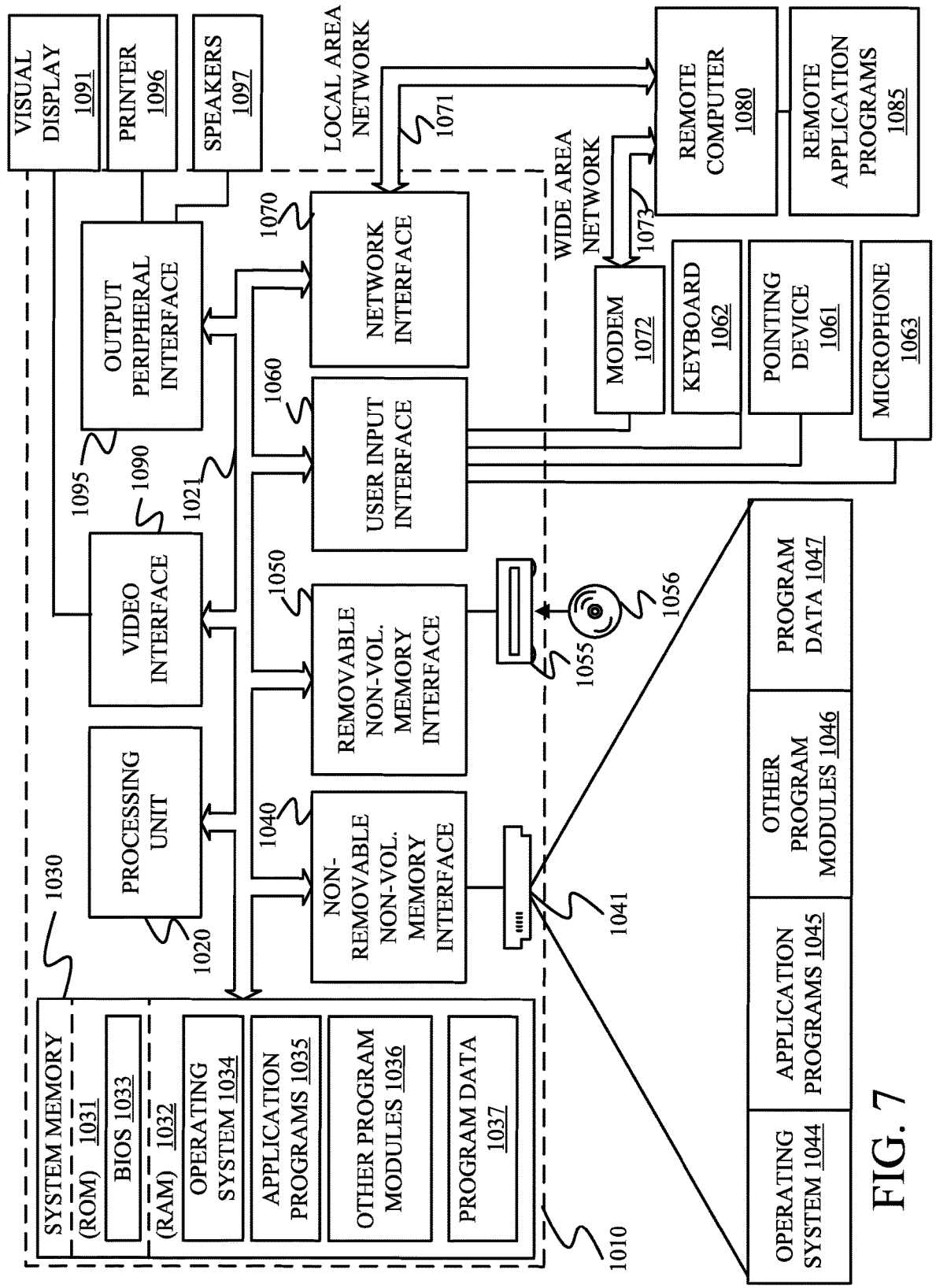
FIG. 7 is a block diagram showing one example of a computing environment that can be used on the agricultural machine and in architectures illustrated in previous figures.

FIG. 7 is one example of a computing environment in which elements of previous FIG., or parts of them, (for example) can be deployed. With reference to FIG. 7, an example system for implementing some embodiments includes a computing device in the form of a computer 1010 programmed to operate as described above. Components of computer 1010 may include, but are not limited to, a processing unit 1020 (which can comprise processors from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to previous FIGS. can be deployed in corresponding portions of FIG. 7.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 832. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 7 illustrates operating system 1034, application programs 1035, other program modules 1036, and program data 1037.

The computer 1010 may also include other removable/non-removable volatile/nonvolatile computer storage media. By way of example only, FIG. 7 illustrates a hard disk drive 1041 that reads from or writes to non-removable, nonvolatile magnetic media, an optical disk drive 1055, and non-volatile optical disk 1056. The hard disk drive 1041 is typically connected to the system bus 1021 through a non-removable memory interface such as interface 1040, and optical disk drive 1055 are typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 1010. In FIG. 7, for example, hard disk drive 1041 is illustrated as storing operating system 1044, application programs 1045, other program modules 1046, and program data 1047. Note that these components can either be the same as or different from operating system 1044, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a controller area network-CAN, local area network-LAN, or wide area network WAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 7 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural sprayer, comprising:
   a boom mounted to the agricultural sprayer,
   a plurality of spray nozzles coupled to the boom to apply material to a field;
   a first optical sensor coupled to the agricultural sprayer and configured to sense an image of a portion of the field ahead of the agricultural sprayer;
   a second optical sensor coupled to the agricultural sprayer and configured to sense an image of the portion of the field after the agricultural sprayer has traveled over the portion of the field;
   at least one processor, and
   memory storing instructions executable by the at least one processor, wherein the instructions, when executed, provide;
   a target identification system configured to detect a target of the agricultural sprayer based on the image sensed by the first optical sensor;
   a nozzle identification system configured to identify a nozzle, of the plurality of spray nozzles, based on the detected target;
   an optics characterization system configured to generate an output indicative of optical characteristics based on the image sensed by the first optical sensor and based on the image sensed by the second optical sensor; and
   a control system configured to generate a control signal to control the identified nozzle to apply material to the target.

2. The agricultural sprayer of claim 1 wherein the target identification system comprises:
   an image processing module configured to identify the target in the sensed image sensed by the first optical sensor.

3. The agricultural sprayer of claim 1 wherein the target identification system comprises:
   a vehicle route processing system configured to identify whether the agricultural sprayer is performing a turn and generate a turn output indicative of the agricultural sprayer performing the turn.

4. The agricultural sprayer of claim 3 wherein the nozzle identification system is configured to identify the nozzle based on the turn output.

5. The agricultural sprayer of claim 4 wherein the target identification system comprises:
a target location system configured to identify a target location based on the sensed image sensed by the first optical sensor.

6. The agricultural sprayer of claim 5 wherein the nozzle identification system is configured to identify the nozzle based on the target location.

7. The agricultural sprayer of claim 1 wherein the first optical sensor is coupled to a front end of the agricultural sprayer.

8. The agricultural sprayer of claim 7 wherein the boom and the second optical sensor are coupled to a back end of the agricultural sprayer.

9. The agricultural sprayer of claim 1, wherein the instructions, when executed provide:
a machine learning system configured to modify the target identification system based on the optical characteristics.

10. The agricultural sprayer of claim 9 wherein the optics characterization system comprises:
a dust/obscurant processor configured to generate the output indicative of dust characteristics or obscurant characteristics that are generated by the agricultural sprayer traveling over the field.

11. The agricultural sprayer of claim 9 wherein the optics characterization system comprises:
a shadow/reflection processor configured to generate the output indicative of shadow characteristics or reflection characteristics that are generated by the agricultural sprayer.

12. An agricultural system, comprising:
an agricultural sprayer having a front end and a back end;
a plurality of spray nozzles coupled to the back end of the agricultural sprayer;
a first optical sensor coupled to the front end of the agricultural sprayer and configured to sense an image of a portion of a field ahead of the agricultural sprayer;
at least one processor, and
memory storing instructions executable by the at least one processor, wherein the instructions, when executed, provide:
a target identification system configured to detect a target of the agricultural sprayer based on the sensed image;
a vehicle route processing system configured to:
identify that the agricultural sprayer is performing a turn; and
generate a turn output indicative of the turn;
a nozzle identification system configured to identify a nozzle, of the plurality of spray nozzles, based on the detected target and the turn output; and
a control system configured to generate a control signal to control the identified nozzle to apply material to the target.

13. The agricultural system of claim 12 wherein the vehicle route processing system is configured to identify a turn angle of the turn, and to generate the turn output indicative of the turn angle, wherein the nozzle identification system is configured to identify the nozzle based on the turn angle.

14. The agricultural system of claim 12 wherein the target identification system comprises:
a target location system configured to identify a target location based on the sensed image, wherein the nozzle identification system is configured to identify the nozzle based on the target location.

15. The agricultural system of claim 12 and further comprising:
a second optical sensor coupled to the back end of the agricultural sprayer and configured to sense an image of the portion of the field behind the agricultural sprayer, after the agricultural sprayer has traveled over the portion of the field.

16. The agricultural system of claim 15 wherein the instructions, when executed, provide:
an optics characterization system configured to generate an output indicative of optical characteristics based on the image sensed by the first optical sensor and based on the image sensed by the second optical sensor; and
a machine learning system configured to modify the target identification system based on the optical characteristics.

17. The agricultural system of claim 12 and further comprising:
a boom mounted on the back end of the agricultural sprayer, the plurality of spray nozzles being mounted to the boom.

18. An agricultural system, comprising:
at least one processor; and
memory storing instructions executable by the at least one processor, wherein the instructions, when executed, cause the agricultural system to:
receive a sensed image of an area of a field ahead of an agricultural sprayer;
detect a target of the agricultural sprayer based on the sensed image;
identify a turn of the agricultural sprayer in the field;
generate a nozzle identifier identifying a nozzle, of a plurality of nozzles on the agricultural sprayer, based on the detected target and based on one or more characteristics of the turn; and
control the identified nozzle to apply material to the target based on the nozzle identifier.

19. The agricultural system of claim 18 wherein the instructions, when executed, cause the agricultural system to identify a location of the target and a timing parameter indicative of when the target will be in range of the identified nozzle and generate a target output indicative of the location and the timing parameter.

20. The agricultural system of claim 18 wherein the instructions, when executed, cause the agricultural system to identify a turn angle of the turn, the one or more characteristics comprise at least the turn angle, and the nozzle is identified based on the turn angle.

* * * * *